(12) United States Patent
Wang

(10) Patent No.: US 8,554,725 B2
(45) Date of Patent: Oct. 8, 2013

(54) SYSTEM AND METHOD FOR HIGHLY RELIABLE DATA REPLICATION

(75) Inventor: Haihong Wang, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/477,999

(22) Filed: May 22, 2012

(65) Prior Publication Data

US 2012/0239778 A1    Sep. 20, 2012

Related U.S. Application Data

(63) Continuation of application No. 12/378,819, filed on Feb. 19, 2009, now Pat. No. 8,209,283.

(51) Int. Cl.
*G06F 17/30* (2006.01)
(52) U.S. Cl.
USPC ............ 707/610; 707/999.201; 709/230
(58) Field of Classification Search
None
See application file for complete search history.

(56) References Cited

U.S. PATENT DOCUMENTS

| | | | |
|---|---|---|---|
| 2005/0195735 A1* | 9/2005 | Brady et al. | 370/216 |
| 2007/0245409 A1* | 10/2007 | Harris et al. | 726/5 |

* cited by examiner

*Primary Examiner* — Anteneh Girma
(74) *Attorney, Agent, or Firm* — Van Pelt, Yi & James LLP

(57) ABSTRACT

Data replication includes generating replication data that is part of a replicated file system to be sent over a communication channel to a destination replication device; adding additional verification information to at least a portion of the replication data to prevent data corruption; and sending the replication data and the additional verification information over the communication channel to the destination replication device. The replication data with additional verification information is sent over the communication channel using a reliable protocol that allows the replication data to be verified by the reliable protocol at the destination replication device. The reliable protocol is a protocol capable of detecting most but not all data corruption introduced by the communication channel. The additional verification information includes information for verifying that replication data sent using the reliable protocol does not include data corruption that was introduced by the communication channel and undetected by the reliable protocol.

23 Claims, 5 Drawing Sheets

SYSTEM AND METHOD FOR HIGHLY RELIABLE DATA REPLICATION

CROSS REFERENCE TO OTHER APPLICATIONS

This application is a continuation of co-pending U.S. patent application Ser. No. 12/378,819, entitled SYSTEM AND METHOD FOR HIGHLY RELIABLE DATA REPLICATION filed Feb. 19, 2009 which is incorporated herein by reference for all purposes.

BACKGROUND OF THE INVENTION

Data replication systems are an important part of today's information technology infrastructure. Some existing data replication systems initially synchronize data on an original (also referred to as the source) system and data on a replicated (also referred to as the destination or backup) system such that the two systems are mirror images of each other, and thereafter send only previously unreplicated data from the source to the destination to conserve bandwidth and storage resources. Any data corruption on the replicated system would be expensive and difficult to repair since data on the original and replicated system would have to be re-synchronized. Such corruption, if not detected in time, could also lead to irrecoverable data loss in the event that the original system suffers data corruption at the same time.

BRIEF DESCRIPTION OF THE DRAWINGS

Various embodiments of the invention are disclosed in the following detailed description and the accompanying drawings.

DETAILED DESCRIPTION

Figure 1:
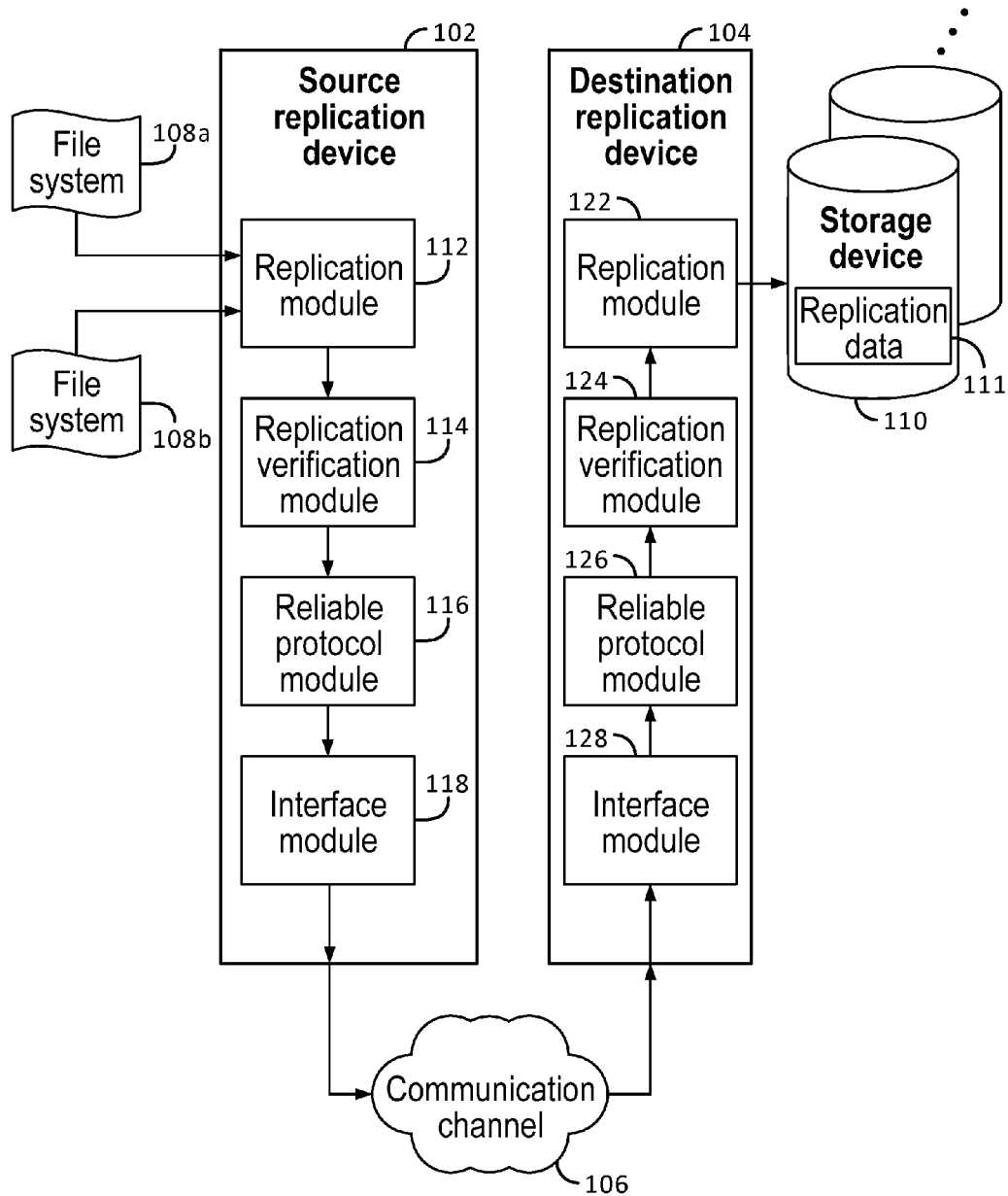
FIG. 1 is a block diagram illustrating an embodiment of a reliable replication system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some data replication systems, particularly data replication systems where the source and destination devices are on separate networks, data corruption on the destination system is often caused by errors that are introduced by the communication channel between the source and destination systems and undetected by the underlying networking protocol. For example, many replication systems use Transmission Control Protocol (TCP) as the protocol for transferring data between networks. TCP is generally considered a reliable protocol because a checksum is employed for data verification. The sender of a data packet computes a checksum based on the content of the packet and append it to the payload of the packet. Upon receiving the packet, the recipient independently computes a checksum based on the data received, and compares it with the checksum included in the packet. Identical checksums indicate that the packet arrived correctly, and different checksums indicate that the packet is corrupt. TCP also provides ways to acknowledge receipt of packets and request resending of packets in the event that data corruption occurs. Currently TCP defines a checksum of 16 bits, which means that there is a probability of $\frac{1}{2^{16}}$ that a corrupt packet can still result in a matching checksum and thus go undetected. In some replication environments, especially environments in which large amounts of data are backed up over a wide area network such that the probability of data corruption is high, there is significant likelihood that a corrupt packet may go undetected and be stored on the destination system. As will be described in greater detail below, in some embodiments, additional verification information is added to at least a portion of replication data to prevent data that is corrupt but undetected by the reliable communication protocol (such as TCP) from being stored.

FIG. 1 is a block diagram illustrating an embodiment of a reliable replication system. In this example, system 100 includes a source portion from which data is originated and a destination portion to which data is transferred and stored. The source portion includes one or more data sources such as file systems 108a and 108b, and a source replication device 102 configured to process and transfer replication data from the data sources. The data sources and source replication devices may be connected directly or via a network. The destination portion includes a destination device 104 configured to receive and process replication data sent by the source replication device, and one or more storage devices 110 for storing replication data 111. The source replication device and the destination device are connected via a communication channel 106. In various embodiments, a communication channel may include a local area network (LAN), a wide area network (WAN), or any other appropriate types of networks. Communication between the source and the destination can be two-way.

The source and destination replication devices cooperate to ensure that data on the source side (such as file systems 108a and 108b) is replicated on the destination network. Replication data 111 does not necessarily have the same format as the original file system data 108a and 108b. In some embodiments, data from the file systems are stored in a space efficient manner on the destination side, along with appropriate reconstruction information that allows the original file systems to be restored based on the stored data. In this example, source replication device 102 includes a replication module 112, a replication verification module 114, a reliable protocol module 116, and an interface module 118. Destination replication device 104 includes a replication module 122, a replication verification module 124, a reliable protocol module 126, and an interface module 128. The modules perform functions that correspond to one or more Open Systems Interconnection Reference Model (OSI Reference Model) layers. On the source device, the modules may add extra information such as verification information, header information, etc. to the data to be replicated. On the destination device, the additional information is processed and/or removed by a corresponding module.

The modules may be implemented using hardware components such as one or more processors, including general purpose processors and/or special purpose circuitries such as Application Specific Integrated Circuits (ASIC), software components such as computer program instructions that operate on one or more processors, or a combination. In some embodiments, the modules are separate components; in some embodiments, two or more modules are combined.

The replication module is configured to identify replication data that is part of a file system to be replicated. For example, portions of file system 108a or 108b may be identified as replication data. In some embodiments, data in the file systems is divided into data segments. Replication module 112 processes the data segments, generates replication data, and sends the replication data to replication verification module 114. As will be described in greater detail below, the replication module implements a replication protocol which first determines whether a data segment has already been stored on the destination side. Depending on whether a data segment has been stored previously, the replication data generated by the replication module would include the data segment itself, a reference to the data segment, or both. The replication verification module adds additional verification information to the replication data. As will be described in greater detail below, the additional verification information provides a stronger check in addition to any verification mechanism implemented by the reliable protocol module to detect any data corruption that was introduced by the communication channel and undetected by the reliable protocol. In some embodiments, the replication module and the replication verification module are referred to as application layer modules because their functions map to the application layer of the OSI Reference Model. The result of the replication verification module conforms to the replication protocol, and is passed on to reliable protocol module 116 to be further processed for transmission to the destination side.

In the example shown, the reliable protocol module corresponds to the transport layer of the OSI Reference Model. In the discussion below, for purposes of example, a reliable protocol module that implements the TCP stack is discussed extensively. Other reliable protocol can be used in other embodiments. In this example, the reliable protocol module processes the replication data segments, rearranges the data into TCP packets, and provides TCP header and checksum information for each TCP packet. The output of the reliable protocol module is passed on to interface module 118, which in this example performs functions that correspond to the network layer, the data layer, and the physical layer of the OSI Reference Model.

The interface module transmits data packets that include replication data and the additional verification information via communication channel 106 to the destination network. Interface module 128 on the destination device receives the transmitted data and performs processing at the physical layer, the data layer, and the network layer, extracting TCP packets to be processed by reliable protocol module 126. In this example, the reliable protocol module verifies whether TCP data has been received correctly by computing a checksum based on the content of the data packet received, and comparing this checksum with the checksum included in the data packet itself. If the checksums match, the reliable protocol module assumes that the TCP packet has been received correctly. Given that the TCP checksum is only 16 bits long, however, there is a probability of $\frac{1}{2^{16}}$ that a corrupt packet can still result in a matching checksum and thus deemed correctly received by the reliable protocol module. To obviate this problem, replication verification module 124 conducts further verification based on the additional verification information included in the replication data by replication verification module 114. In some embodiments, the additional verification information includes a long hash value computed based on the data packet, such as a MD5 hash that is 128-bit long. Additional verification information independently computed based on the content of the data packet is compared with the additional verification information included in the data packet. Successfully verified replication data is passed on to replication module 122, which stores the replication data on appropriate storage devices.

Figure 2:
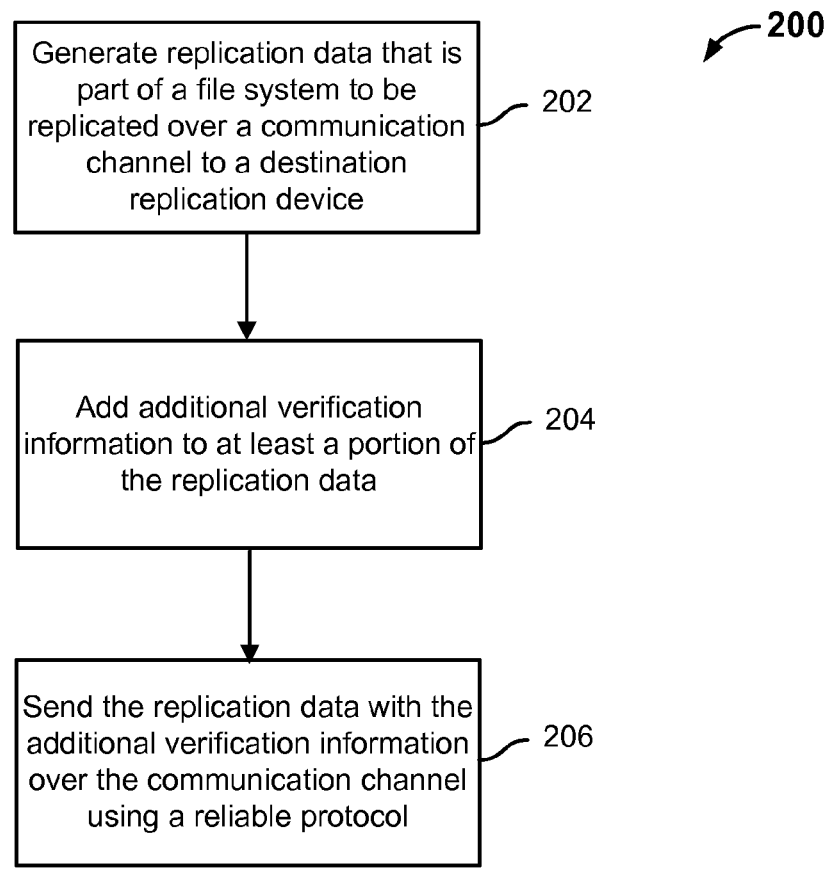
FIG. 2 is a flowchart illustrating an embodiment of a data replication process on the source side.

FIG. 2 is a flowchart illustrating an embodiment of a data replication process on the source side. Process 200 may be implemented on a device such as source replication device 102. At 202, replication data is generated. The replication data corresponds to at least a part of file system data to be replicated via a communication channel on a destination replication device. In some embodiments, the replication data includes information pertaining to one or more data segments, such as the contents of the data segments and/or references to the data segments. A variety of techniques for generating the replication data can be used, for example the techniques described in U.S. Pat. No. 7,143,251 entitled DATA STORAGE USING IDENTIFIERS, which is incorporated herein by reference for all purposes.

At 204, additional verification information is added to at least a portion of the replication data to prevent data corruption. The additional verification information is computed based at least in part on the content of the replication data. Computation techniques that result in strong verification information (i.e., a long value that has low probability of undetected corruption) and that are fast are selected for generating the additional verification information. In some embodiments, the additional verification information includes a long hash, such as a 128-bit MD5 hash. At 206, the replication data and the additional verification information are sent over the communication channel to the destination replication device, using a reliable protocol that allows replication data sent over the communication channel to be verified by the reliable protocol at the destination replication device. In some embodiments, the reliable protocol also adds its own protocol verification data. Since the reliable protocol such as TCP is capable of detecting most but not all data corruption introduced by the communication channel, the additional verification information is used by the destination device to catch corrupt data that is undetected by the reliable protocol. Process 200 may be repeated until all replication data on the source side is sent to the destination side.

Figure 3:
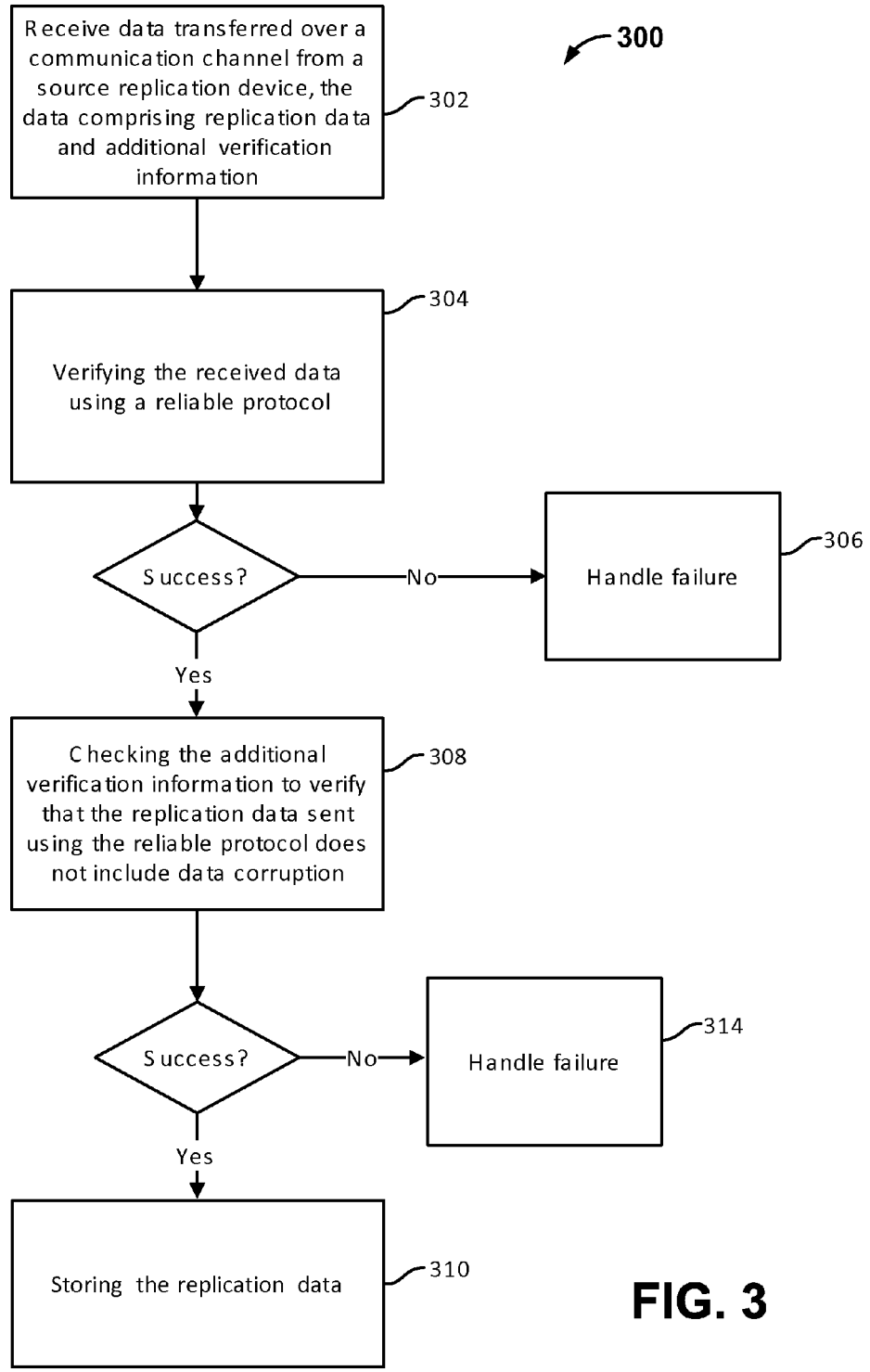
FIG. 3 is a flowchart illustrating another embodiment of a data replication process.

FIG. 3 is a flowchart illustrating another embodiment of a data replication process. Process 300 may be implemented on a device such as destination replication device 104. At 302, data transferred over a communication channel from a source replication device is received. In some embodiments, the received data was generated and transmitted from the source replication device implementing a process such as 200 of FIG. 2. The received data includes replication data and additional verification information. At 304, received data is verified according to the reliable protocol implemented on the destination replication device. In embodiments that employ TCP as the reliable protocol, for example, the verification includes computing and comparing a checksum of the received data packet to determine whether the packet got corrupted during transmission. If the verification fails, the failure condition is handled at 306. In some embodiments, the reliable protocol module sends an acknowledgement packet to the source indicating that incorrect data has been received and requests the source to resend data. If the verification succeeds, the additional verification information included in the received data is checked to further verify that the received data does not include data corruption that was introduced by the communication channel but undetected by the reliable protocol. For example, in embodiments where a strong verification value such as a 128-bit MD5 hash is used as the additional verification information, the verification value included in the received data is compared with a verification value computed using at least part of the received data. It is determined whether the additional verification is successful. If the additional verification succeeds, at 310, the replication data is stored. If, however, the additional verification fails, it indicates that the received data is corrupt but undetected by the reliable protocol. The failure condition is handled at 314. In some embodiments, the replication module makes a request to the source replication device to resend the replication data.

Figure 4:
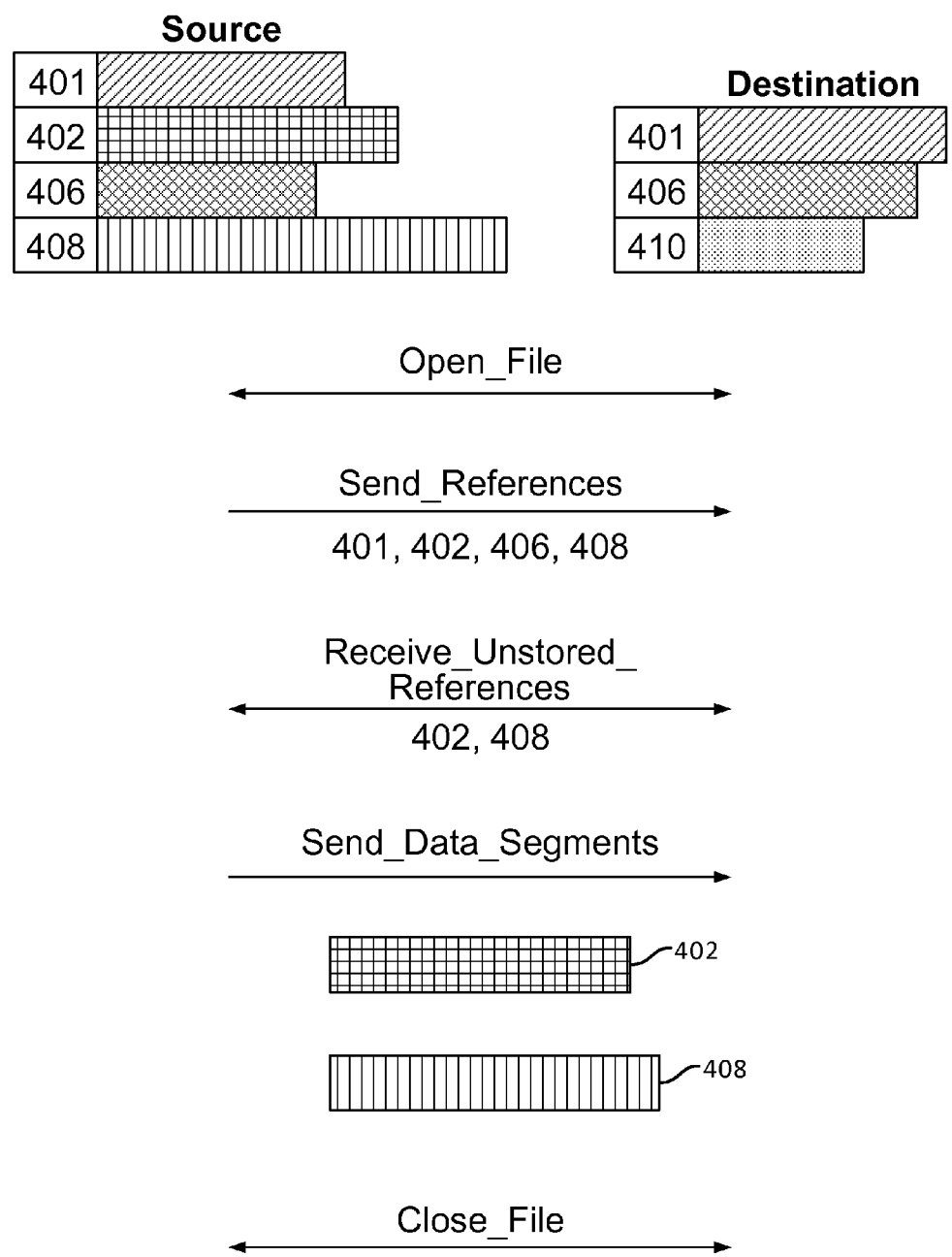
FIG. 4 illustrates an embodiment of a replication protocol and its associated messages.

FIG. 4 illustrates an embodiment of a replication protocol and its associated messages. In this example, the messages passed between the source and the destination replication devices are Remote Procedure Calls (RPCs). Initially, the source replication device makes an Open_File call to the destination to open the data files for replication. In the example shown, the data to be replicated is divided into data segments that are identified by segment references. Data segments with references of 401, 402, 406, and 408 are stored on the source and need to be replicated. The reference numbers are shown in the diagram and the actual content of the data segments are omitted. The data segments can have different sizes, with the average size being a few thousand bytes. In this system, data segments with identical content are stored only once on the destination device. The source device then makes a Send_References call to asynchronously send the reference values to the destination replication device to indicate the data segments that need to be replicated. On the destination side, data segments with data segment references 401, 406, and 410 have been stored. Thus, when the source device later makes a Receive_Unstored_References call, references 402 and 408 are returned, indicating to the source device that these segments are unavailable on the destination and should be sent to the destination. The contents of data segments 402 and 408 are sent by a Send_Data_Segments call and replicated on the destination storage. When replication is complete, a Close_File call is made.

RPC calls such as Send_References, Receive_Unstored_References, and Send_Data_Segments all include important replication data, whether it is data segment references or the contents of the data segments themselves. Additional verification information is added to the data structures used in the RPC calls.

Figure 5:
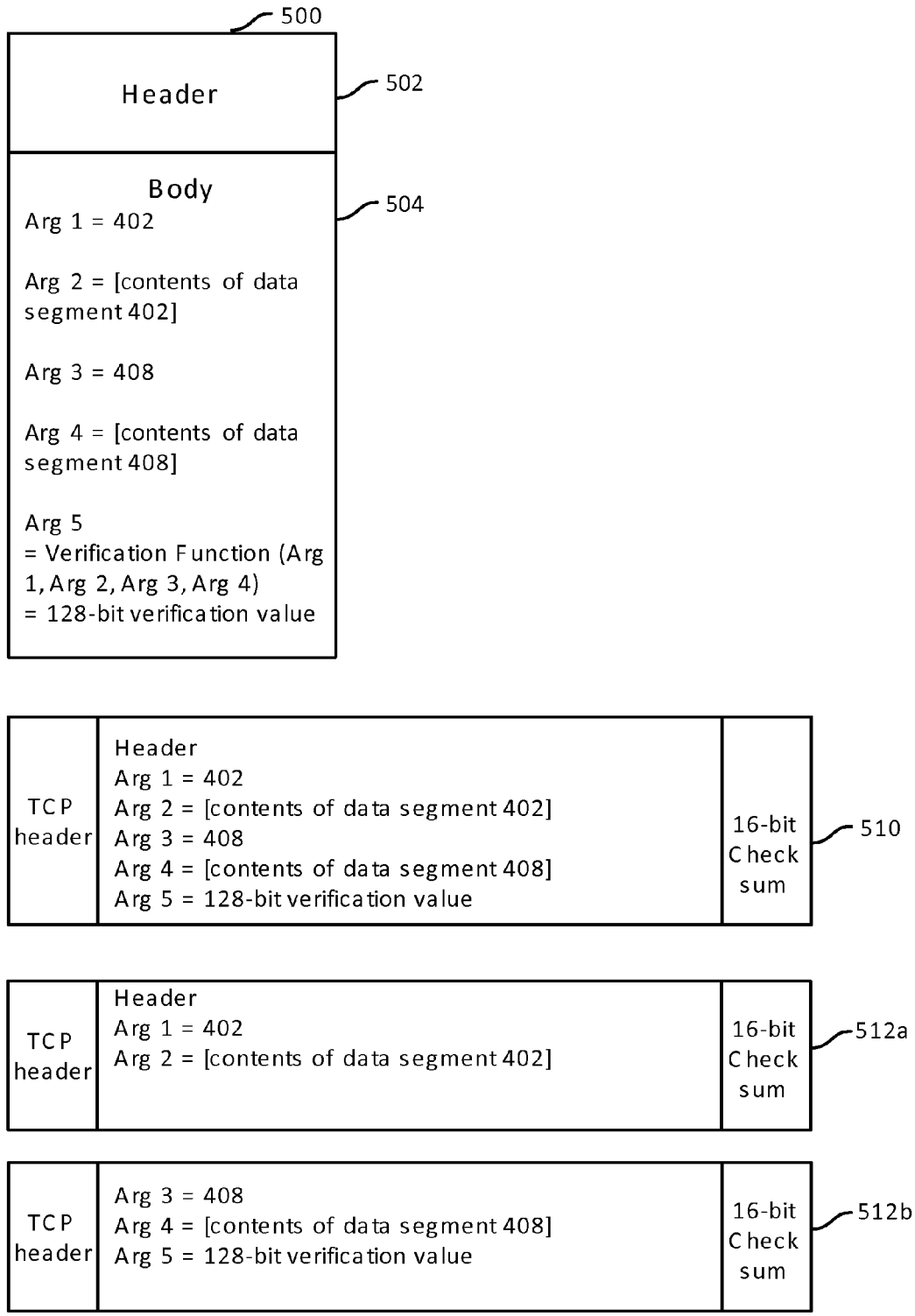
FIG. 5 includes block diagrams illustrating embodiments of data structures used by the data replication system described above.

FIG. 5 includes block diagrams illustrating embodiments of data structures used by the data replication system described above. An example RPC data structure 500 (also referred to as an RPC packet) is shown. The RPC data structure is used by Send_Data_Segments RPC call to transfer replication data to the destination. Data structure 500 includes a header portion 502 and a body portion 504. In this example, replication data stored in the body portion includes data segment references 402 and 408, and contents of these referenced data segments. The data segment references and data contents are stored separately as RPC data arguments. Different data formats can be used in other embodiments. For example, a data segment can be divided into multiple arguments; an RPC data structure can include a single data segment reference, contents of a single data segment, or a single reference/contents pair. In this example, the last argument of the RPC packet is the value of a verification function computed based on the other arguments of the RPC data structure. In this example, a hashing technique is applied to the data segments to produce a strong verification value. In some embodiments, a MD5 function is used to generate a 128-bit verification number.

The reliable protocol rearranges the data structure used by the replication protocol for sending data. In one example, data in RPC packet 500 is encapsulated in TCP packet 510. The TCP packet includes a 16-bit checksum that is computed based on the TCP payload. Upon receiving the TCP packet, the destination device uses TCP protocol to verify the received data based on the 16-bit checksum. Packet 510 is correctly verified first by checking its 16-bit checksum against a 16-bit checksum computed based on the TCP payload. Once the TCP packet is successfully verified, the RPC packet is verified again by comparing the 128-bit additional verification value of Argument 5 with an independently computed verification value that is based on the contents of the RPC packet. Since the 128-bit additional verification value is much stronger than the 16-bit checksum used by TCP, passing the additional verification ensures that the RPC packet does not include data corruption that is introduced by the channel but undetected by the TCP protocol.

In the above example, a single RPC packet is encapsulated in a single TCP packet. In some cases an RPC packet is divided into multiple TCP packets, such as TCP packets 512a, and 512b, with the RPC header, Arguments 1 and 2 forming the payload of TCP packet 510, and arguments 3-5 forming the payload of packet 512. The division of RPC data into TCP packets depends on factors such as the amount of data in an argument and can vary for different RPC packets. For example, the contents of a single argument may be divided into several portions and included in the payloads of several TCP packets in some embodiments. Upon receiving the TCP packets, the destination device verifies the TCP packets using the 16-bit TCP checksum according to the TCP protocol. Payloads of successfully verified TCP packets are rearranged to recreate the RPC packet, the content of which is further verified using the 128-bit additional verification value.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A reliable replication system comprising:
a processor configured to:
generate replication data, wherein the replication data corresponds to at least a part of file system data to be replicated on a destination replication device;
generate additional verification information based at least in part on at least a portion of the replication data;
include in a first container the replication data and the additional verification information;
include the first container in a second container associated with a reliable protocol; and
an interface coupled to the processor, configured to send the second container including the first container over a communication channel to the destination replication device, wherein the destination replication device is configured to verify the replication data, upon receipt, at least in part by determining whether at least a portion of the second container can be verified using the reliable protocol and in the event that the second container is verified by the reliable protocol, then checking the additional verification information included in the first container to further verify that the replication data does not include data corruption that was introduced by the communication channel and undetected by the reliable protocol, wherein a verification associated with the additional verification information is stronger than a verification associated with the reliable protocol.

2. The system of claim 1, wherein the replication data includes a data segment.

3. The system of claim 1, wherein the replication data includes a data segment reference.

4. The system of claim 1, wherein the verification associated with the reliable protocol for detecting data corruption introduced by the communication channel includes using a reliable protocol checksum; and the additional verification information includes an additional verification checksum that includes more bits than the reliable protocol checksum.

5. The system of claim 1, wherein the reliable protocol is Transport Control Protocol (TCP).

6. The system of claim 1, wherein the reliable protocol is Transport Control Protocol (TCP), and the additional verification information includes a value that is greater in length than a TCP checksum.

7. The system of claim 1, wherein the additional verification information is generated using an MD5 function.

8. The system of claim 1, wherein the additional verification information is included in a Remote Procedure Call (RPC) argument.

9. The system of claim 1, wherein the additional verification information is included in a Remote Procedure Call (RPC) argument and is determined based at least in part on at least one other RPC argument.

10. The system of claim 1, wherein the first container is a Remote Procedure Call (RPC) packet.

11. The system of claim 1, wherein the second container is a Transport Control Protocol (TCP) packet.

12. A data replication method comprising:
generating replication data, wherein the replication data corresponds to at least a part of file system data to be replicated on a destination replication device;
generating additional verification information based at least in part on at least a portion of the replication data;
including in a first container the replication data and the additional verification information;
including the first container in a second container associated with a reliable protocol; and
sending the second container including the first container over a communication channel to the destination replication device, wherein the destination replication device is configured to verify the replication data, upon receipt, at least in part by determining whether at least a portion of the second container can be verified using the reliable protocol and in the event that the second container is verified by the reliable protocol, then checking the additional verification information included in the first container to further verify that the replication data does not include data corruption that was introduced by the communication channel and undetected by the reliable protocol, wherein a verification associated with the additional verification information is stronger than a verification associated with the reliable protocol.

13. The method of claim 12, wherein the replication data includes a data segment.

14. The method of claim 12, wherein the replication data includes a data segment reference.

15. The method of claim 12, wherein the verification associated with the reliable protocol for detecting data corruption introduced by the communication channel using a reliable protocol checksum; and the additional verification information includes an additional verification checksum that includes more bits than the reliable protocol checksum.

16. The method of claim 12, wherein the reliable protocol is Transport Control Protocol (TCP).

17. The method of claim 12, wherein the reliable protocol is Transport Control Protocol (TCP), and the additional verification information includes a value that is greater in length than a TCP checksum.

18. The method of claim 12, wherein the additional verification information is generated using an MD5 function.

19. The method of claim 12, wherein the additional verification information is included in a Remote Procedure Call (RPC) argument.

20. The method of claim 12, wherein the additional verification information is included in a Remote Procedure Call (RPC) argument and is determined based at least in part on at least one other RPC argument.

21. The method of claim 12, wherein the first container is a Remote Procedure Call (RPC) packet.

22. The method of claim 12, wherein the second container is a Transport Control Protocol (TCP) packet.

23. A computer program product for data replication, the computer program product being embodied in a non-transitory computer readable storage medium and comprising computer instructions for:
generating replication data, wherein the replication data corresponds to at least a part of file system data to be replicated on a destination replication device;
generating additional verification information based at least in part on at least a portion of the replication data;
including in a first container the replication data and the additional verification information;
including the first container in a second container associated with a reliable protocol; and
sending the second container including the first container over a communication channel to the destination replication device, wherein the destination replication device is configured to verify the replication data, upon receipt, at least in part by determining whether at least a portion of the second container can be verified using the reliable protocol and in the event that the second container is verified by the reliable protocol, then checking the additional verification information included in the first container to further verify that the replication data does not include data corruption that was introduced by the communication channel and undetected by the reliable protocol, wherein a verification associated with the additional verification information is stronger than a verification associated with the reliable protocol.

* * * * *